April 9, 1968

C. E. LIPP ETAL 3,377,009

BONDING MACHINES

Filed April 23, 1965

INVENTORS
CHARLES E. LIPP
ALPHONZO RAKUS
GEORGE W. VICARY

ATTORNEYS

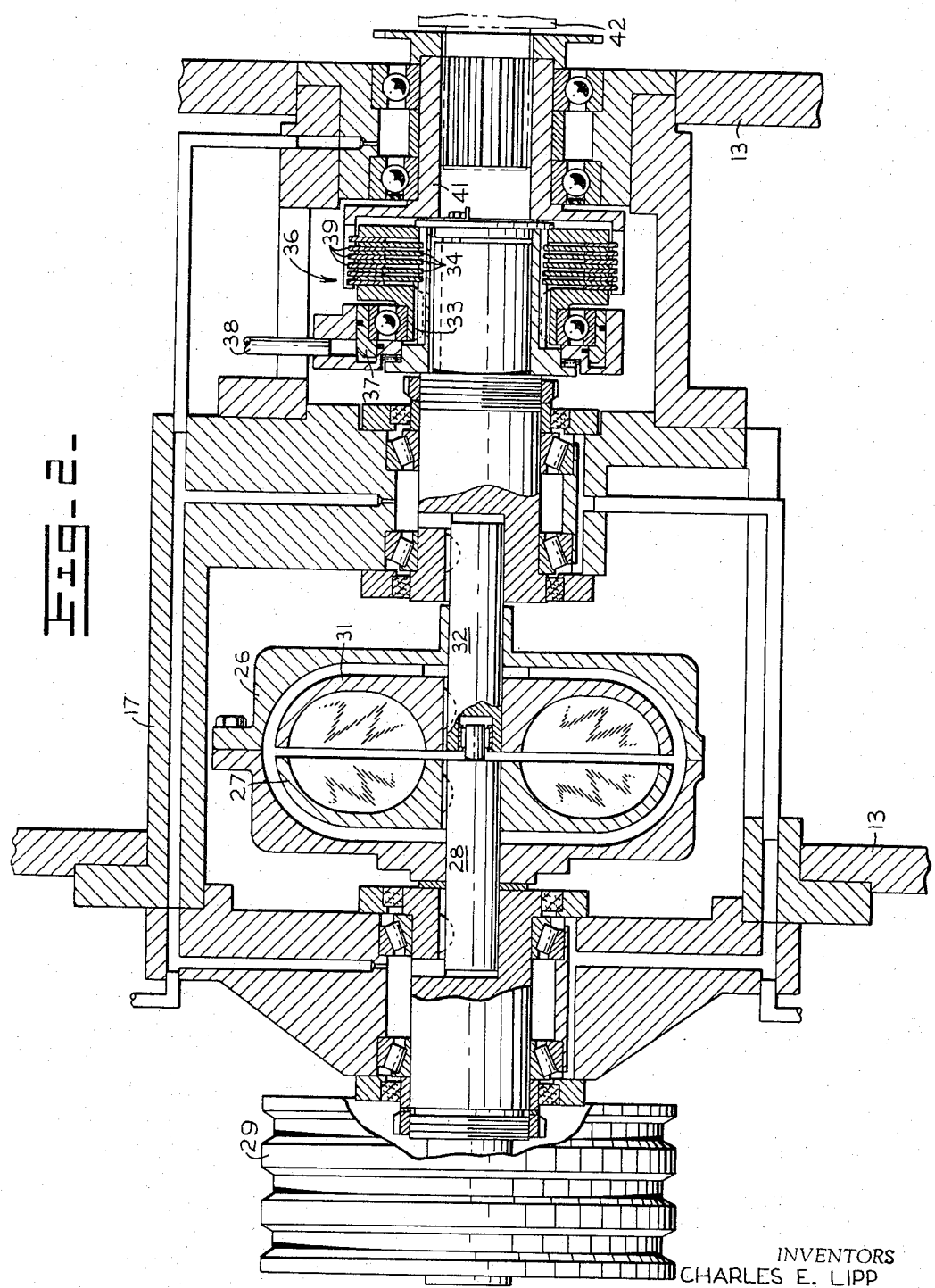

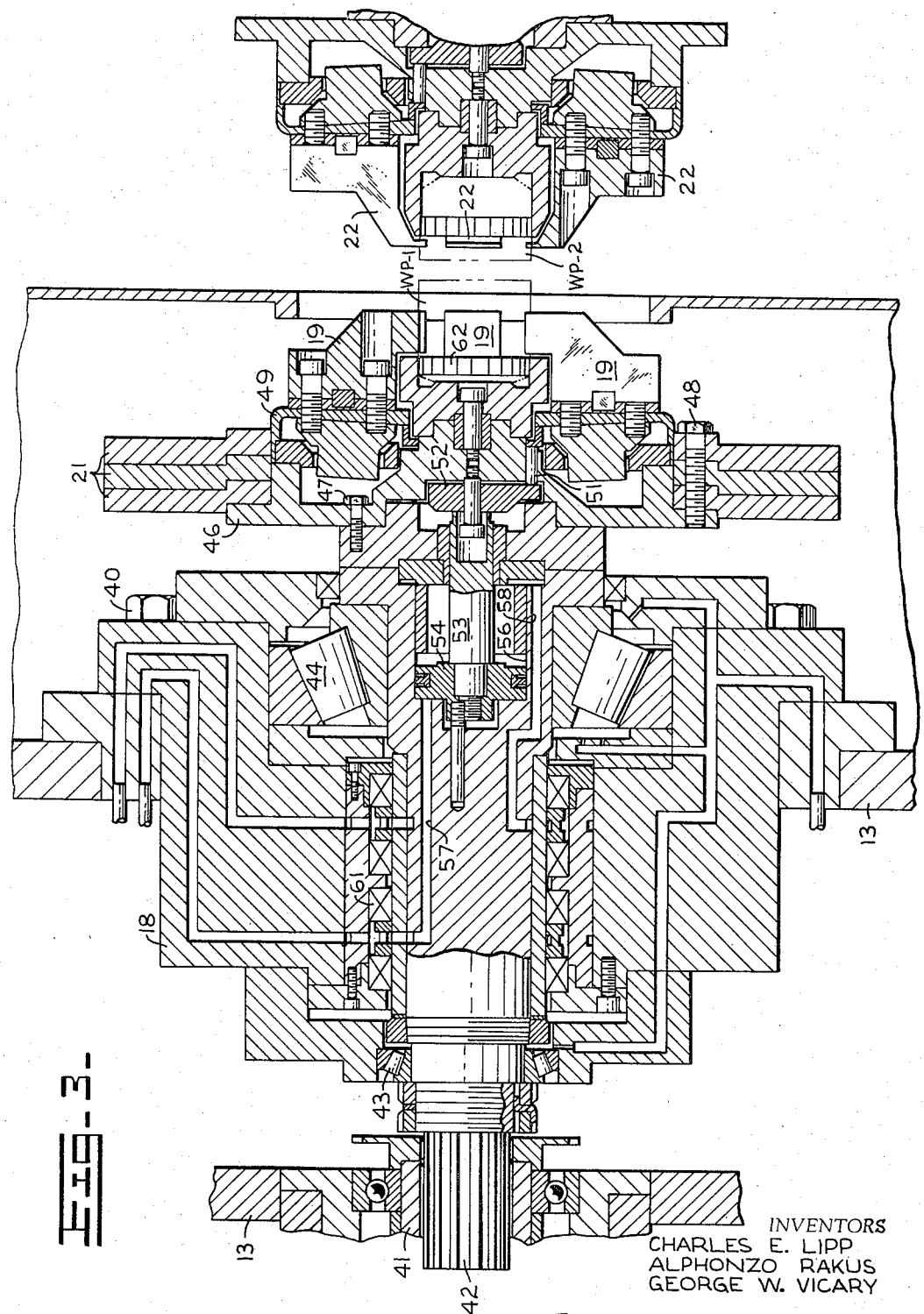

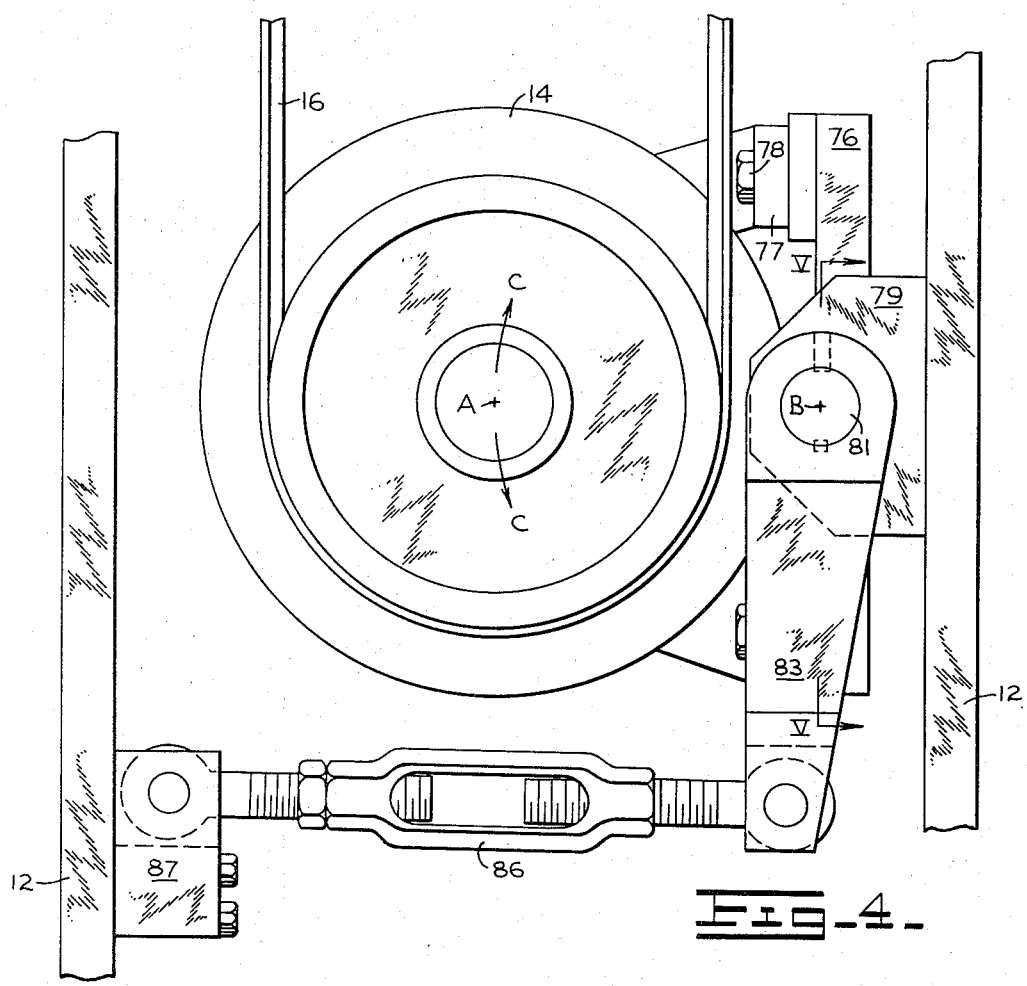
Fig-4-
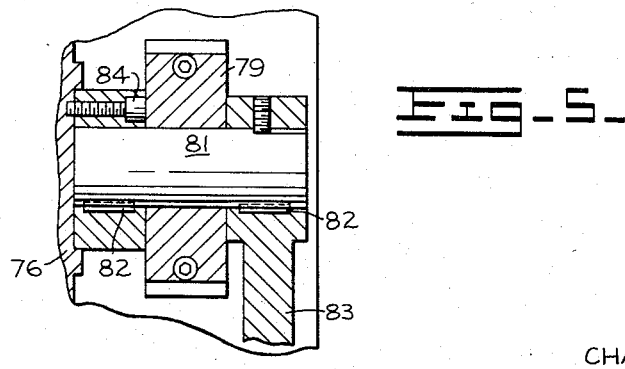
Fig-5-
INVENTORS
CHARLES E. LIPP
ALPHONZO RAKUS
GEORGE W. VICARY
ATTORNEYS April 9, 1968  C. E. LIPP ETAL  3,377,009
BONDING MACHINES
Filed April 23, 1965  5 Sheets-Sheet 5
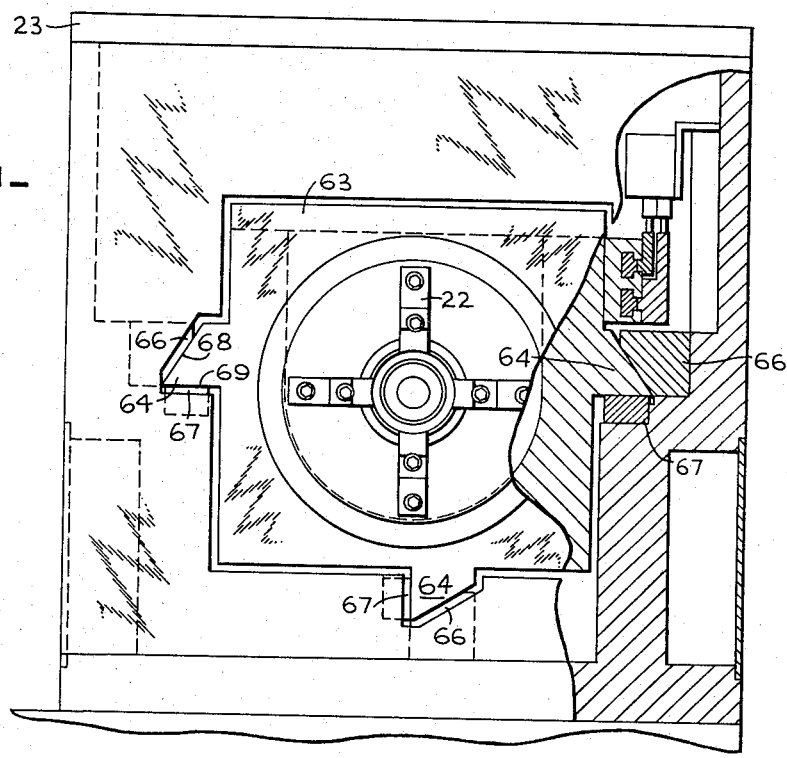
Fig-6-
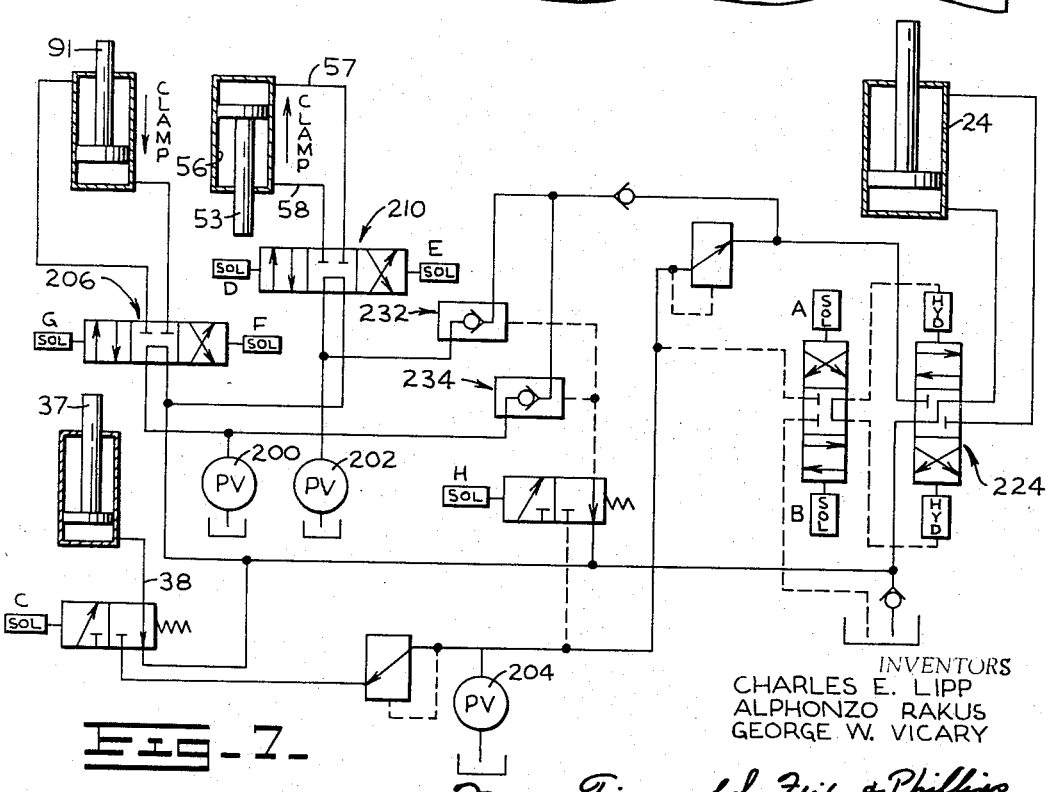
Fig-7-
INVENTORS
CHARLES E. LIPP
ALPHONZO RAKUS
GEORGE W. VICARY
ATTORNEYS United States Patent Office 3,377,009
Patented Apr. 9, 1968

3,377,009
BONDING MACHINES
Charles E. Lipp, Alphonzo Rakus, and George W. Vicary, Peoria, Ill., assignors to Caterpillar Tractor Co., Peoria, Ill., a corporation of California
Filed Apr. 23, 1965, Ser. No. 450,286
2 Claims. (Cl. 228—2)

ABSTRACT OF THE DISCLOSURE

An inertia welding machine includes a disc type clutch and a hydraulic coupling between a drive motor and the inertia weights to prevent slippage of the clutch discs when the motor is connected with the stationary inertia weight. The machine also includes a combined chuck and flywheel hub carrier assembly which is detachably connected to one end of the drive spindle so that the chuck and inertia weights can be readily replaced to accommodate different size parts to be welded.

---

This invention relates to a bonding machine of the kind wherein two parts to be bonded are engaged in rubbing contact under pressure at a common interface to heat and to work the interface to a bondable condition. This invention has particular application to a machine of this kind wherein an inertial weight is connected to one of the parts and is used to store all of the kinetic energy needed to bond the parts..

In bonding machines of this kind the inertial weight is the key element in the control of the process. All of the energy to be supplied to the bond is stored in the inertial weight. The function of the motor is only to bring the inertial weight up to the selected rotational speed. After that, the motor is either de-energized or is disconnected from the inertial weight while the energy stored in the inertial weight is discharged into the bond as the inertial weight slows to a stop at the conclusion of the bonding operation.

After the bonded parts are removed from the bonding machine and new parts to be bonded are placed in the machine, the motor must again be connected with the inertial weight to bring the inertial weight up to the desired rotational speed. If the motor has been de-energized valuable production time is lost in accelerating the motor and related drive components up to the necessary rotational speed. If the motor has only been decoupled from the inertial weight, less time is required to accelerate the inertial weight to the desired rotational speed. However, the inertial weight is often quite large, and re-engagement of a continuously running motor with the stationary inertial weight can present serious problems of shock to the drive line components. Such re-engagement can also cause slippage of a clutch used to decouple and couple the inertial weight and the motor.

It is therefore a primary object of the present invention to cushion the shock by placing a hydraulic or other suitable slip-type coupling between the motor and the inertial weight.

In a preferred form of the present invention a disc type clutch is used to disconnect the motor from the inertial weight, and a hydraulic coupling is positioned between the motor and the disc type clutch. This location of the hydraulic coupling prevents slippage of the discs of the clutch when these discs are engaged at the beginning of a bond cycle to restore the connection between the motor and inertial weight.

A bonding machine might be required to bond parts of quite widely varying sizes and configurations. It is therefore desirable that the machine permit quick and convenient changing of the size of the inertial weight.

The chucking mechanism for holding the parts to be bonded should also be easy to change. It is another object of the present invention to mount the inertial weight and chuck at one end of the drive spindle in a manner whereby the inertial weight and the chuck can be easily and quickly detached from the drive spindle. It is very desirable to be able to replace the weight and chuck without disturbing the other components of the drive line. In a preferred form of the invention the chuck merely plugs into the end of the drive spindle by a splined connection. The chuck may be readily changed by merely removing capscrews.

To keep the bonding machine as compact as possible, the motor is offset from the main drive line and is placed alongside some of the other components of the drive line. A belt and pulley arrangement connects the motor to the other drive components. It is another feature of the present invention that the motor is pivotally mounted on the machine frame, and the pivotal mounting is so arranged that a minimum amount of space is required for adjusting the belt tension.

Other and further objects of the present invention will be apparent from the following description and claims and are illustrated in the accompanying drawings which, by way of illustration, show preferred embodiments of the present invention and the principles thereof and what are now considered to be the best modes contemplated for applying these principles. Other embodiments of the invention embodying the same or equivalent principles may be used and structural changes may be made as desired by those skilled in the art without departing from the present invention and the purview of the appended claims.

In the drawings:

FIG. 2 is a cross-section view through the slip-type coupling of the machine shown in FIG. 1;

FIG. 3 is a cross-section view through the chuck spindle of the machine shown in FIG. 1;

FIG. 4 is a fragmentary end elevation view showing details of the motor mounting of the machine shown in FIG. 1;

FIG. 5 is a fragmentary cross-section view taken along the line and in the direction indicated by the arrows V—V in FIG. 4;

FIG. 6 is an end elevation view, partly broken away, taken along the line and in the direction indicated by the arrows VI—VI in FIG. 1; and FIG. 7 is a schematic view of the control circuit for the machine shown in FIG. 1.

Figure 1:
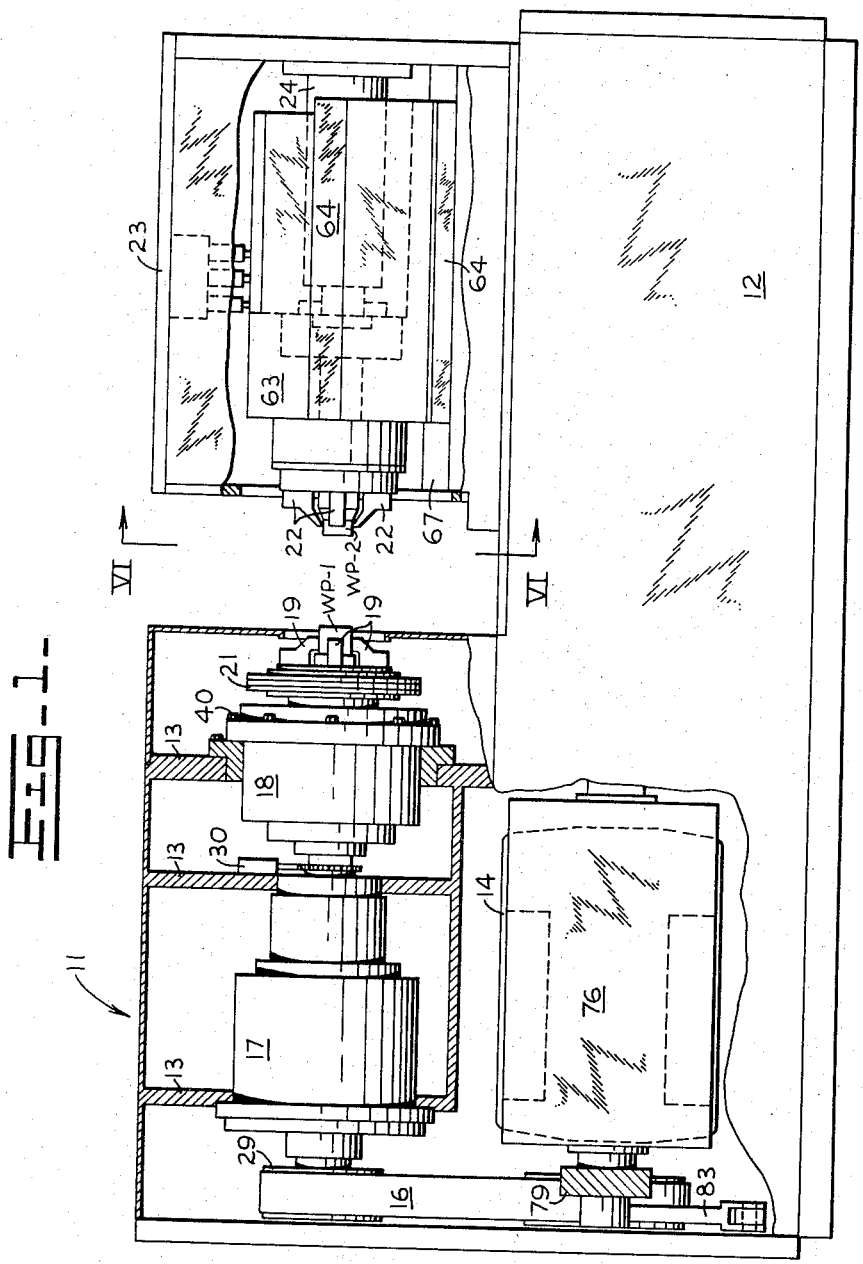
FIG. 1 is a front elevation view, partly broken away and with some interior parts shown in phantom outline to show details of construction, of a bonding machine constructed in accordance with one embodiment of the present invention.

In FIG. 1 a machine constructed in accordance with one embodiment of the present invention is indicated generally by the reference numeral 11.

The machine 11 has a generally L-shaped frame formed by side plates 12 joined by cross members 13.

The machine includes a motor 14 connected by a belt 16 to drive a rotary spindle of a coupling 17. The output of the coupling 17 is connected to a chuck mechanism 18. The chuck mechanism 18 clamps a first workpiece WP–1 between spring loaded clamping jaws 19.

One or more inertial weights 21 are mounted on the rotary spindle of the chuck mechanism 18. These inertial weights, when rotated at a selected speed, serve to store the kinetic energy needed for making a bond between a first work-piece WP–1 and a second workpiece WP–2.

The second workpiece WP–2 is clamped between clamping jaws 22 of a fixture mechanism 23. The fixture mechanism 23 is mounted on a bed plate secured to the horizontal portion of the L-shaped frame members 12. The workpiece WP-2 is held in position by non-rotatable clamping jaws 22. The clamping jaws and workpiece are movable in an axial direction by a hydraulically actuated ram 24 to press the two workpieces in engagement at their interface.

During periods of operation of the machine 11, the electric motor 14 preferably is constantly powered, and the belt 16 is continuously driven. The coupling 17 serves to connect the motor 14 to the inertial weights 21 until the inertial weights are brought up to the desired speed. When the required amount of energy has been stored in the inertial weights, the coupling 17 disconnects the drive from the motor 14 to the inertial weights, and the ram 24 is then energized to press the workpieces together to engage the workpieces in rubbing contact. The stored energy is discharged from the inertial weights as the rubbing contact slows the rotation of workpiece WP-1 to a stop at the end of the cycle.

After the first workpiece WP-1 has been removed from the chuck mechanism 18, and a new part to be bonded has been clamped between the clamping jaws 19, the coupling 17 again engages the continuously powered motor 14 with the rotatable chuck spindle to bring the spindle and inertial weights 21 back up to the desired rotational speed.

Since the inertial weights have a substantial amount of inertia, an abrupt re-engagement of the motor with the inertial weights could put a large amount of shock on the drive components.

In accordance with the present invention, the coupling 17 incorporates a slip-type coupling which cushions this shock. As shown in FIG. 2, the preferred form of the present invention incorporates a hydraulic coupling 26 which permits some slip during initial re-engagement of the motor drive. The impeller member 27 is keyed to a shaft 28 driven by the belt pulley 29. The rotor 31 of the hydraulic coupling is keyed to a shaft 32.

The shaft 32 is in turn connected, through a splined connection 33, to a member which carries friction discs 34 of a clutch 36. A piston 37, energized by pressurized fluid supplied through conduit 38, serves to press the discs 34 against interleaved discs 39 to connect an output member 41 in driving relation with the shaft 32.

When pressurized hydraulic fluid is not applied to the piston 37, the disc stack is not compressed in driving relation and the shaft 32 is freely rotatable with respect to the output member 41.

The disc clutch 36 thus serves to couple the motor 14 to the inertial weights 21 and to decouple the motor 14 from the inertial weights 1.

The hydraulic coupling is positioned between the motor 14 and the clutch 36 to prevent slippage of the clutch discs when the clutch is energized to connect the motor with the stationary inertial weight. The hydraulic coupling permits the desired amount of slippage to occur as the difference between the rotational speeds of the output member 41 and the shaft 28 is reduced. Thus, excessive loads on the clutch discs and other drive line components are avoided.

While the hydraulic coupling has been illustrated and described and is a preferred form of the present invention, other slip-type couplings can be used. For example, in some installations a single eddy current or magnetic coupling can be used in place of the hydraulic coupling 26 and clutch 36.

With reference now to FIG. 3, the novel features of the chuck spindle 18 will now be described. The chuck mechanism 18 includes a rotatable spindle 42 connected through a splined connection to the output member 41 of the clutch 36. The rotary spindle 42 is supported for rotation by a small tapered roller bearing 43 and a large tapered roller bearing 44. The large bearing 44 also serves to support the axial thrust generated by bringing the workpieces into contact under pressure.

It is a feature of the present invention that the inertial weights and clamping mechanism for any size and shape of workpiece WP-1 can be readily removed and replaced, if necessary, to accommodate a different size and shape of workpiece. Thus, the chuck mechanism 18 merely plugs into the end of the output member 41 by a splined connection and may be readily removed by removing the capscrews 40 shown in FIG. 1.

As shown in FIG. 3, the inertial weights 21 are mounted on a flange carrier member 46, which is in turn secured to one end of the rotary spindle 42 by a series of cap screws 47. The inertial weights 21 are mounted on the carrier 46 by cap screws 48 and can be easily removed or installed.

The clamping jaws 19 are spring loaded toward the clamping position by spring 49. The clamping jaws 19 are released from the clamping position by plungers 51 which engage the inner end of the spring 49 to flex it outwardly in response to axial movement, in a rightward direction as viewed in FIG. 3, of a pressure plate 52.

The pressure plate 52 is in turn actuated by a piston rod 53 of a piston 54 disposed in a cylinder 56 formed in the interior of the rotary spindle 42. Pressurized hydraulic fluid supplied through a conduit 57 to the back face of the piston 54 releases the clamping jaws 19, while pressurized fluid supplied through conduits 58 to the opposite face of the piston 54, moves the piston in a left-ward direction to permit the spring 49 to flex the clamping jaws 19 into clamping contact with the workpiece WP-1.

Face seals 61 prevent leakage of fluid between the rotary spindle 42 and the non-rotary housing of the chuck spindle 18.

The chuck preferably includes a socket formed with serrations 62 which receive tangs of the workpiece to provide a positive drive connection between the chuck and the workpiece.

The construction and mode of operation of the clamping jaws 22 of the non-rotary fixture 23 are substantially the same as described with reference to the clamping jaws 19.

As shown in end elevation in FIG. 6, the fixture 23 includes an axially movable member 63 which is slidably supported in the fixture 23 by three machineways 64. The machineways 64 slide on removable hardened wear strips 66 and 67.

The wear strip 66 has a surface 68 which engages one surface of the machineway 64, and the wear strip 67 has a surface 69 which engages another surface of the machineway 64. The surfaces 68 and 69 and coacting surfaces of the machineways are disposed in a triangular relationship, and this triangular relationship maintains the axially movable member 63 in alignment with the rotary spindle 42.

The non-rotary chuck is secured to the outer end of the axially movable member 63. Thus, extension of the hydraulic ram 24 moves the non-rotating workpiece WP-2 into engagement with the rotating workpiece WP-1.

As best shown in FIG. 1, the motor 14 is offset from the main drive line and is placed alongside and beneath the other components of the drive line. This arrangement reduces the over-all length of the machine as compared to an arangement in which the motor would be connected in line with the other drive components.

Since the motor is connected to the other drive components by a belt, some means must be provided for adjusting the belt tension. The present invention minimizes the space required for making an adjustment of the motor. This feature of the present invention will be apparent from the description of FIGS. 4 and 5 which follows.

As shown in FIG. 4, the motor 14 is mounted on a mounting plate 76 by brackets 77 which are secured to the mounting plate 76 by cap screws 78.

The mounting plate 76 is in turn pivotally connected to the machine frame 12 by a bracket 79 and a shaft 81. The shaft 81 is keyed, as shown in FIG. 5 by keys 82 to a lever arm 83. The lever arm 83 is secured by a plurality of caps crews 84, see FIG. 5, to the mounting plate 76. The free end of the lever arm 83 is connected by a turnbuckle 86 to a bracket 87 secured to the machine frame 12.

This construction, and in particular the spacing between the axis B of the shaft 81 and the axis A of the motor 14, permits the axis A of the motor 14 to swing in an arc, indicated by the arrows C—C in FIG. 4, which has little curvature and which is essentially parallel to the plane passing through the axis of the motor 14 and the axis of the drive spindle 42. This minimizes the space required for adjustment of the belt tension. The motor 14 moves in directions which are essentially directly toward or directly away from the drive spindle. A plane passing through the axes A of the motor 14 and B of the shaft 81 is substantially perpendicular to the plane passing through the axes of the motor 14 and drive spindle. This disposition also contributes to the essentially planar movement of the axis A of the motor 14.

FIG. 7 is a schematic view of one control circuit which can be used with the machine 11 having the constructional features noted above.

After the proper pressure, flywheel mass and spindle velocity have been selected, the machine operational procedure in reference to FIG. 7 is as follows:

A pump starting button, not shown, is pressed to start electric motors for driving three pumps 200, 202 and 204.

An automatic cycle button can be pressed to energize the motor 14 for continuous operation. Optionally, the motor 14 may be operated intermittently, starting at the beginning of each bond cycle.

A part is placed in the fixture chuck and a button is pressed to energize solenoid G associated with the fixture clamp valve 206. This shifts the valve 206 rightward to direct pressure from the pump 200 to the rod end of the fixture clamp cylinder to move the piston rod 91 in a direction to permit the clamping jaws 22 to engage the workpiece WP-2.

The other workpiece is placed in the spindle chuck, and solenoid D is energized to shift the spindle clamp valve 210 to the right. This directs pressure from the pump 202 to the rod end of the spindle clamp cylinder to permit the clamping jaws 19 to engage the workpiece WP-1.

Solenoids B and H are energized to establish ram rapid forward travel, and solenoid C is energized to engage the clutch 36. Solenoid B shifts valve 224 to direct pressure to the head end of ram cylinder 24 to advance the stationary chuck toward the rotating spindle. Energization of solenoid H opens the check valves 232 and 234 to combine the volumes of pumps 200 and 202 with pump 204 to produce rapid travel of the part 63.

After clutch 36 is engaged, the rotating spindle is accelerated to a speed in excess of that desired for the bonding operation. Limit switches, not shown, then de-actuate the clutch 36.

Further travel of the ram 24 depresses another limit switch (not shown) to stop rapid travel of the ram and to cause the ram to dwell slightly until spindle deceleration, as sensed by a transducer 30 shown in FIG. 1, closes tachometer contacts. Closing of the tachometer contacts energizes a solenoid B to shift the ram control valve 224 to a position to direct pressure from pump 204 to the head end of the ram cylinder 24 to bring the parts to be bonded into contact.

Suitable timing mechanism can be included to provide whatever dwell period is desired at the conclusion of the bonding operation. At the end of such a dwell period, solenoids A and H are energized to properly position valve 224 and to open check valves 232 and 234 to initiate rapid travel of the ram 24 back to the cycle start position. The fixture and spindle clamping cylinders are also energized to unclamp the finished assembly.

The part may then be removed from the spindle chuck, and a new cycle may then be initiated by placing unwelded parts in the fixture and spindle chucks.

While we have illustrated and described the preferred embodiments of our invention, it is to be understood that these are capable of variation and modification, and we therefore do not wish to be limited to the precise details set forth, but desire to avail ourselves of such changes and alterations as fall within the purview of the following claims.

We claim:

1. A machine for bonding parts by engaging the parts in rubbing contact under pressure to heat and to work the interface between the parts to a bondable condition, said machine including a first chuck for holding one part, a second chuck for holding the other part, a motor, an inertial weight connected to the first chuck for storing kinetic energy from the motor, and drive means between the motor and inertial weight for rotating the first chuck with respect to the second chuck, said drive means including slip type coupling means for decoupling the motor from the inertial weight when sufficient energy has been stored in the weight to perform the weld, and for absorbing the shock of engaging the motor with the inertial weight the motor can be continuously operated and can be connected in drive relation with the stationary inertial weight at the end of a bond cycle to accelerate the weight to the desired rotational speed in a minimum length of time and without imposing excessive shock on re-engagement of the coupling with inertial weight, said slip type coupling comprising a disc type clutch for coupling and decoupling the motor and the inertia weight and a hydraulic coupling positioned between the motor and the disc type clutch to prevent slippage of the clutch discs when the motor is connected with the stationary inertia weight.

2. A bonding machine as defined in claim 1 wherein the drive means include a drive spindle and chuck release means carried within and rotatable with the drive spindle and wherein the first chuck and inertial weight are detachably connected to one end of the drive spindle so that the first chuck and inertial weight can be readily replaced without disturbing the other components of the drive means and the machine can be quickly changed over to accommodate different size parts.

References Cited
UNITED STATES PATENTS

| | | | |
|---|---|---|---|
| 2,050,960 | 8/1936 | Olivetti | 308—3 |
| 2,768,406 | 10/1956 | Carle | 308—3 |
| 2,719,761 | 10/1955 | Bonnafe | 308—3 |
| 2,993,388 | 7/1961 | Brill et al. | 74—242.15 |
| 3,041,023 | 6/1962 | Odlum et al. | 74—242.15 |
| 3,109,524 | 11/1963 | Howard | 192—3.33 |
| 3,202,018 | 8/1965 | Hilpert | 192—3.33 |
| 3,224,537 | 12/1965 | Hilpert | 192—3.33 |
| 3,235,158 | 2/1966 | Hollander | 228—2 |
| 3,235,162 | 2/1966 | Hollander | 29—470.3 |

RICHARD H. EANES, Jr., *Primary Examiner.*

UNITED STATES PATENT OFFICE

CERTIFICATE OF CORRECTION

Patent No. 3,377,009                                          April 9, 1968

Charles E. Lipp et al.

It is certified that error appears in the above identified patent and that said Letters Patent are hereby corrected as shown below:

Column 3, line 50, "weights 1" should read -- weights 21 --. Column 4, line 9, "flange" should read -- flanged --. Column 6, line 30, after "weight" insert -- whereby --; line 35, after "with" insert -- the --.

Signed and sealed this 5th day of August 1969.

(SEAL)
Attest:

Edward M. Fletcher, Jr.                            WILLIAM E. SCHUYLER, JR.
Attesting Officer                                               Commissioner of Patents